US006762261B2

(12) United States Patent
Deviny et al.

(10) Patent No.: US 6,762,261 B2
(45) Date of Patent: Jul. 13, 2004

(54) POLYMERIZABLE SYSTEM WITH A LONG WORK-LIFE

(75) Inventors: E. John Deviny, Roseville, MN (US); Virginia C. Marhevka, Maplewood, MN (US)

(73) Assignee: 3M Innovative Properties Company, St. Paul, MN (US)

(*) Notice: Subject to any disclaimer, the term of this patent is extended or adjusted under 35 U.S.C. 154(b) by 158 days.

(21) Appl. No.: 10/081,266

(22) Filed: Feb. 21, 2002

(65) Prior Publication Data

US 2002/0161155 A1 Oct. 31, 2002

Related U.S. Application Data

(60) Provisional application No. 60/270,221, filed on Feb. 21, 2001.

(51) Int. Cl.$^7$ .................................................. C08F 4/52
(52) U.S. Cl. ..................... 526/198; 526/204; 526/213; 526/216; 526/220; 526/222; 526/328
(58) Field of Search ................. 526/198, 204, 526/213, 216, 220, 222, 328

(56) References Cited

U.S. PATENT DOCUMENTS

| 4,538,920 A | 9/1985 | Drake |
| 5,082,147 A | 1/1992 | Jacobs |
| 5,106,928 A | 4/1992 | Skoultchi et al. |
| 5,286,821 A | 2/1994 | Skoultchi |
| 5,310,835 A | 5/1994 | Skoultchi et al. |
| 5,616,796 A | 4/1997 | Pocius et al. |
| 5,859,160 A | 1/1999 | Righettini et al. |
| 5,883,208 A | 3/1999 | Deviny |
| 5,935,711 A | 8/1999 | Pocius et al. |
| 5,952,409 A | 9/1999 | Boardman et al. |
| 6,027,813 A | 2/2000 | Deviny |
| 6,252,023 B1 | 6/2001 | Moren |

FOREIGN PATENT DOCUMENTS

| WO | WO 97/17383 | 5/1997 |
| WO | WO 99/64475 | 12/1999 |
| WO | WO 01/32716 A1 | 5/2001 |
| WO | WO 01/68783 A2 | 9/2001 |

OTHER PUBLICATIONS

Fujisawa et al., "Studies on Dental Self–Curing Resins (11), Charactarization of the various complexes of Tri–n–butyl borane as an initiator", *Reports of the Institute for Medical and Dental Engineering*, vol. 3, (1969), pp. 64–71.

*Primary Examiner*—Helen L. Pezzuto
(74) *Attorney, Agent, or Firm*—Colene H. Blank

(57) ABSTRACT

The present invention is directed to a polymerizable system. The polymerizable system comprises an organoborane, at least one polymerizable monomer, and a work-life extending agent.

15 Claims, No Drawings

POLYMERIZABLE SYSTEM WITH A LONG WORK-LIFE

This application claims the benefit of U.S. Provisional Application No. 60/270,221, filed Feb. 21, 2001.

FIELD OF THE INVENTION

This invention relates generally to systems capable of initiating the polymerization of (meth)acrylic monomers. Specifically, this invention relates to the addition of a work-life extending agent to polymerizable (meth)acrylic monomers, as well as polymerizable systems made therewith.

DESCRIPTION OF THE RELATED ART

Systems for initiating the polymerization of (meth)acrylic monomers to make adhesive compositions are known in the art. U.S. Pat. Nos. 5,106,928, 5,286,821, and 5,310,835, for example, disclose a two part initiator system that is reportedly useful in (meth)acrylic adhesive compositions. The first part of this two part system includes a stable organoborane amine complex and the second part includes an activator. The activator liberates the organoborane compound by removing the amine group, thereby allowing the organoborane compound to initiate the polymerization process.

The organoborane compound of the complex has the general formula:

where $R^1$, $R^2$ and $R^3$ are either alkyl groups having 1 to 10 carbon atoms or phenyl groups. Useful amine compounds for the complex include n-octylamine, 1,6-diaminohexane, diethylamine, dibutylamine, diethylenetriamine, dipropylenediamine, ammonia, 1,3-propylenediamine, and 1,2-propylenediamine.

U.S. Pat. No. 5,286,821 reports that suitable activators for liberating the organoborane compound include aldehydes having the general structure:

wherein R is alkyl of 1 to 10 carbon atoms or aryl having 6 to 10 carbon atoms and x is 1 to 2. Examples include benzaldehyde, o-, m-, p-nitrobenzaldehyde, 2,4-dichlorobenzaldehyde, p-tolylaldehyde, and 3-methoxy-4 hydroxybenzaldehyde.

U.S. Pat. No. 5,310,835 reports that suitable activators also include organic acids having the structure:

wherein R is H, alkyl, or alkenyl having 1 to 8 carbon atoms. Examples include acrylic acid, methacrylic acid, benzoic acid, and p-methoxybenzoic acid.

Fujisawa, Imai, and Mashuhara also describe a system for initiating the polymerization of methyl methacrylate. See Reports of the Institute for Medical and Dental Engineering, 3, 64 (1969). The system comprises a trialkylborane amine complex and an activator such as the chloride of methacrylic or n-butane sulfonic acid, terephthalic acid chloride, benzoyl chloride, p-toluene sulfonic acid chloride, benzene sulfonic acid chloride, methane sulfonic acid chloride, toluene diisocyanate, adipic acid chloride, o-tolyl isocyanate, acetyl chloride, and anhydrous acetic acid. The initiator system is reportedly useful in providing fast curing resins for dental applications.

With increasingly demanding end-user requirements, adhesive composition formulators are constantly being challenged to improve both application performance (e.g. work-life, rate of strength increase and cure time) and physical property performance (e.g. T-peel strength) of adhesive compositions. It is often times the case that a formulation change enhances one property of an adhesive composition while diminishing a second property of the adhesive composition.

In many industrial and consumer applications for adhesive compositions a long work-life is highly desirable. Work-life refers to the maximum time period available for bringing the adhesive composition into contact with the substrate(s) to be bonded (i.e. closing the bond) after the initiation of the cure of the adhesive composition. If the substrates are brought into contact with the adhesive composition after the work-life has expired, the ultimate strength of the bond formed between the substrates may be compromised.

Several techniques have been reported for increasing the work-life of polymerizable systems. In one known technique, slowing the cure rate of the polymerizable system, for example by reducing the amount of polymerization initiator in the polymerizable system and/or the chemical reactivity of the initiator, increases work-life. This technique, however, may typically lengthen the overall cure time, but may slow the rate of strength increase of the polymerizable system.

The addition of certain polymerizable monomers to polymerizable systems has also been reported to increase work-life. U.S. Pat. No. 5,859,160 (Righettini et al.) reports a free radical curable composition, useful as a two part adhesive, that includes a free radical curable compound and a vinyl aromatic compound that is chemically different than the free radical curable compound. The vinyl aromatic compound is present in an amount that is reportedly sufficient to decelerate the cure rate of the free radical composition without adversely effecting completion of cure and the properties of the curable composition after it has cured.

A need therefore exists for an adhesive having an increased work-life while maintaining other properties, such as rate of strength increase, cure time and T-peel strength.

SUMMARY

The present invention is directed to a polymerizable system comprising an organoborane, at least one polymerizable monomer, and a work-life extending agent. The work-life extending agent may be according to one of the general formula:

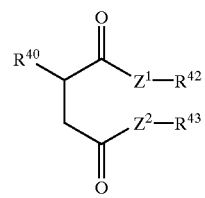

wherein $R^{40}$ is $CH_2=$ or alkenyl, $Z^1$ and $Z^2$ are independently O, $N-R^{41}$ or S, and $R^{41}$, $R^{42}$ and $R^{43}$ are independently H, alkyl, aryl or cycloalkyl, provided that when $Z^1$ and $Z^2$ are O, $R^{42}$ and $R^{43}$ are independently alkyl, aryl or cycloalkyl.

The work-life extending agent may also be according to the general formula:

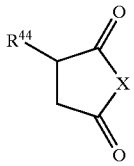

wherein $R^{44}$ is $CH_2=$ or alkenyl and X is S or $N—R^{50}$, where $R^{50}$ is hydrogen, alkyl, aryl or cycloalkyl.

Additionally, the polymerizable system of the invention may also include a complexing agent comprising a material selected from amines, amidines, hydroxides, alkoxides, and combinations thereof. In such a case, the work-life extending agent may be according to the general formula:

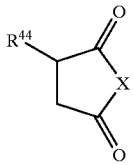

wherein $R^{44}$ $CH_2=$ or alkenyl and X is O and the ratio of anhydride groups in the work-life extending agent to amine, amidine, hydroxide or alkoxide groups in the complexing agent(s) is over 3.0:1.0.

The work-life extending agent may also be of the general formula:

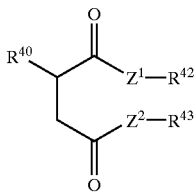

wherein $R^{40}$ is $CH_2=$ or alkenyl, $R^{42}$ is H or alkyl, $R^{43}$ is H, and $Z^1$ and $Z^2$ are O and the ratio of amine-, amidine-, hydroxide- or alkoxide-reactive groups in the work-life extending agent to amine, amidine, hydroxide or alkoxide groups in the complexing agent(s) is over 3.0:1.0.

DETAILED DESCRIPTION OF THE PREFERRED EMBODIMENTS

The present invention provides polymerizable systems that are particularly useful in providing an extended work-life for two-part polymerizable systems, especially those that cure (i.e., polymerize) to (meth)acrylic adhesives.

The polymerization initiator systems used in the present invention include an organoborane. If the organoborane initiator is complexed, for example with an amine, a decomplexer, which is preferably kept separate from the organoborane initiator until cure of the polymerizable system, is also necessary.

The polymerization initiator systems can be directly combined with polymerizable monomers for a two-part polymerizable system in a convenient, commercially useful, whole number mix ratio of 1:10 or less. In some embodiments, the work-life extending agent may act as both a work-life extending agent for the organoborane initiator and as a decomplexer, for example itaconic anhydride. In such embodiments, the work-life extending agent is preferably kept separate from the organoborane initiator until the polymerizable system is cured.

The individual components of the initiator systems, monomer systems and polymerizable systems of the present invention are described in detail below.

Organoborane:

The organoborane initiates free-radical copolymerization of the polymerizable monomer to form a polymer that can be useful as a polymerizable system, for example a (meth) acrylic adhesive. The organoborane initiator may be represented by the following general formula:

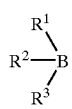

where $R^1$ is an alkyl group having 1 to about 10 carbon atoms. $R^2$ and $R^3$ may be the same or different and are independently selected from alkyl groups having 1 to about 10 carbon atoms and phenyl-containing groups. Preferably, $R^1$, $R^2$ and $R^3$ are independently selected from alkyl groups having 1 to about 5 carbon atoms. Accordingly, $R^1$, $R^2$ and $R^3$ may all be different, or more than one of $R^1$, $R^2$ and $R^3$ may be the same. Together, $R^1$, $R^2$ and $R^3$, along with the boron atom (B) to which they are attached, form the initiator. Specific organoborane initiators include, for example, trimethylborane, triethylborane, tri-n-propylborane, triisopropylborane, tri-n-butylborane, triisobutylborane, and tri-sec-butylborane.

Preferred organoborane initiators are complexed with a complexing agent and may be represented by the following general formula:

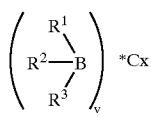

wherein $R^1$, $R^2$ and $R^3$ are as described above and wherein Cx is a complexing agent.

Complexing Agents:

Useful complexing agents (Cx) include, for example, amines, amidines, hydroxides and/or alkoxides. The ratio of complexing agent (Cx) to boron atoms in the complex is represented by "v" and is preferably selected so as to provide an effective ratio of the complexing agent and boron atoms. The complexing agent to boron atom ratio in the complex is broadly about 1:1 to 4:1. Preferably, however, the ratio is about 1:1 to 2:1, more preferably about 1:1 to 1.5:1, and most preferably about 1:1. A complexing agent to boron atom ratio of less than 1:1 could leave free organoborane, a material that tends to be pyrophoric.

Amine Complexing Agents:

Amine complexing agents (Cx) may be provided by a wide variety of materials having at least one amine group, including blends of different amines. Amine complexing agents may also be polyamines (i.e., materials having two or more amine groups such as two to four amine groups).

In one embodiment the amine complexing agent may be a primary or secondary monoamine, such as those represented by the structure:

wherein $R^4$ and $R^5$ are independently selected from the group consisting of hydrogen, alkyl groups having 1 to 10 carbon atoms, alkylaryl groups in which the amine group is not directly attached to the aryl structure, and polyoxyalkylene groups. Particular examples of these amines include ammonia, ethylamine, butylamine, hexylamine, octylamine, benzylamine, and polyoxyalkylene monoamines (e.g., JEFFAMINES from Huntsman Chemical Company, such as M715 and M2005).

In another embodiment, the amine may be a polyamine such as those described by the structure:

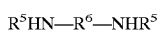

wherein $R^5$ is as defined above and wherein $R^6$ is a divalent, organic radical comprised of an alkyl, aryl or alkylaryl group. Preferred among these materials are alkane diamines, which may be branched or linear, and having the general structure:

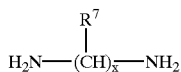

in which x is a whole number greater than or equal to 1, more preferably about 2 to 12, and $R^7$ is hydrogen or an alkyl group. Particularly preferred examples of alkane diamines include 1,2-ethanediamine, 1,3-propanediamine, 1,5-pentanediamine, 1,6-hexanediamine, 1,12-dodecanediamine, 2-methyl-1,5-pentane diamine, 3-methyl-1,5-pentane diamine, and isomers of these materials. While alkane diamines are preferred, other alkyl polyamines may be used such as triethylene tetraamine and diethylene triamine.

Useful polyamines may also be provided by a polyoxyalkylenepolyamine. Polyoxyalkylenepolyamines suitable in making complexes for the invention may be selected from the following structures:

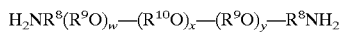

(i.e., polyoxyalkylene diamines); or

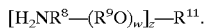

$R^8$, $R^9$ and $R^{10}$ are alkylene groups having 1 to 10 carbon atoms and may be the same or may be different. Preferably, $R^8$ is an alkylene group having 2 to 4 carbon atoms such as ethylene, n-propylene, iso-propylene, n-butylene or iso-butylene. Preferably, $R^9$ and $R^{10}$ are alkylene groups having 2 or 3 carbon atoms such as ethylene, n-propylene or iso-propylene. $R^{11}$ is the residue of a polyol used to prepare the polyoxyalkylenepolyamine (i.e., the organic structure that remains if the hydroxyl groups are removed). $R^{11}$ may be branched or linear, and substituted or unsubstituted (although substituents should not interfere with oxyalkylation reactions).

The value of w is $\geq 1$, more preferably about 1 to 150, and most preferably about 1 to 20. Structures in which w is 2, 3 or 4 are useful too. The value of x and y are both $\geq 0$. The value of z is >2, more preferably 3 or 4 (so as to provide, respectively, polyoxyalkylene triamines and tetraamines). It is preferred that the values of w, x, y and z be chosen such that the resulting complex is a liquid at room temperature ("room temperature" refers to, herein, a temperature of about 20 to 22° C.) as this simplifies handling and mixing thereof. Usually, the polyoxyalkylenepolyamine is itself a liquid. For the polyoxyalkylenepolyamine, molecular weights of less than about 5,000 may be used, although molecular weights of about 1,000 or less are more preferred, and molecular weights of about 140 to 1,000 are most preferred.

Examples of particularly preferred polyoxyalkylenepolyamines include polyethyleneoxidediamine, polypropyleneoxidediamine, polypropyleneoxidetriamine, diethyleneglycoldipropylamine, triethyleneglycoldipropylamine, polytetramethyleneoxidediamine, poly(ethyleneoxide-co-propyleneoxide)diamine, and poly(ethyleneoxide-co-propyleneoxide)triamine.

Examples of suitable commercially available polyoxyalkylenepolyamines include various JEFFAMINES from Huntsman Chemical Company such as the D, ED, and EDR series diamines (e.g., D-400, D-2000, D-5000, ED-600, ED-900, ED-2001, and EDR-148), and the T series triamines (e.g., T-403), as well as DCA-221 from Dixie Chemical Company.

As reported in U.S. Pat. No. 5,616,796 (Pocius et al.), the disclosure of which is incorporated herein by reference, the polyamine may also comprise the condensation reaction product of diprimary amine-terminated material (i.e., the two terminal groups are primary amine) and one or more materials containing at least two groups reactive with primary amine.

Hydroxide/Alkoxide Complexing Agents:

Hydroxide and/or alkoxide complexing agents (Cx) are reported in copending application having U.S. application Ser. No. 09/433,476 (Moren), filed Nov. 4, 1999, the disclosure of which is incorporated herein by reference. Preferred hydroxide and/or alkoxide complexing agents may be represented by the formula:

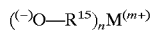

wherein:

$R^{15}$ is independently selected from hydrogen or an organic group (e.g., alkyl or alkylene group);

$M^{(m+)}$ represents a countercation (e.g., sodium, potassium, tetraalkylammonium, or combinations thereof);

n is an integer greater than zero; and m is an integer greater than zero.

Amidine Complexing Agents:

Amidine complexing agents may be represented by the formula:

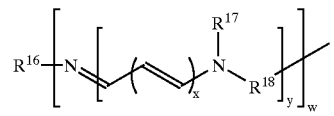

wherein:

$R^{16}$ is hydrogen or an organic group, preferably hydrogen or an alkyl or alkylene group;

$R^{17}$ and $R^{18}$ are independently a monovalent organic group or part of a cyclic structure; and w, x, and y comprise integers, preferably w being 1 and x being about 3 or less.

Particularly preferred amidine complexing agents comprise those selected from the group consisting of N,N,N', N'-tetramethylguanidine; 1,8-diazabicyclo[5.4.0]undec-7-ene; 1,5-diazabicyclo[4.3.0]non-5-ene; 2-methylimidazole; 2-methylimidazoline; and 4-(N,N-dimethylamino)-pyridine.

An organoborane complex may be readily prepared using known techniques. Typically, the complexing agent is combined with the organoborane in an inert atmosphere (e.g., a glovebox flushed with nitrogen to an environment having less than 100 ppm oxygen) with slow stirring. The organoborane can be added from a pressure equalizing dropping funnel to a flask into which the coupling agent has been previously weighed. An exotherm is often observed and cooling of the mixture is, therefore, recommended. Addition of the organoborane may be moderated to control the exotherm. If the ingredients have a high vapor pressure, it is desirable to keep the reaction temperature below about 70° to 80° C. Once the materials have been well mixed the complex is permitted to cool to room temperature. No special storage conditions are required although it is preferred that the complex be kept in a capped vessel in a cool, dark location. A crystalline mass of the complex can be heated (e.g., to about 55° C.) with an oil bath and outside of the nitrogen environment to liquefy the complex and facilitate its transfer to the storage vial, which can be flushed with nitrogen.

The organoborane is employed in an effective amount, which is an amount large enough to permit (meth)acrylic monomer polymerization to readily occur to obtain an acrylic polymer of high enough molecular weight for the desired end use. If the amount of organoborane is too low, then the polymerization may be incomplete or, in the case of adhesives, the resulting composition may have poor adhesion. On the other hand, if the amount of organoborane is too high, then the polymerization may proceed too rapidly to allow for effective mixing and use of the resulting composition.

Large amounts of organoborane could potentially weaken the bond formed by a polymerizable system of the present invention. The useful rate of polymerization will depend in part on the method of applying the composition to a substrate. Thus, a faster rate of polymerization may be accommodated by using a high speed automated industrial adhesive applicator rather than by applying the composition with a hand applicator or by manually mixing the composition.

Within these parameters, an effective amount of the organoborane is an amount that preferably provides about 0.003 to 1.5%-wt. boron, more preferably about 0.008 to 0.5%-wt. boron, most preferably about 0.01 to 0.3%-wt. boron. The %-wt. of boron in a composition is based on the total weight of the composition, less fillers, non-reactive diluents, and other non-reactive materials. The %-wt. of boron in the composition may be calculated by the following equation:

$$\frac{(\text{weight of organoborane in the composition}) \times (\text{\%-wt. of boron in the organoborane})}{(\text{Total weight of the composition less non-reactive components})}$$

Decomplexer:

When complexed organoborane initiators are used as the organoborane initiator in a polymerizable systems of the present invention, the polymerizable systems further comprise a decomplexer in the monomer system. The term "decomplexer" as used herein refers to a compound capable of liberating the initiator (e.g., organoborane) from its complexing agent, thereby enabling initiation of the polymerizable monomer of the polymerizable system. Decomplexers may also be referred to as "activators" or "liberators" and these terms may be used synonymously herein.

When the organoborane is complexed with an amine, a suitable decomplexer is an amine reactive compound. The amine reactive compound liberates organoborane by reacting with the amine, thereby removing the organoborane from chemical attachment with the amine. A wide variety of materials may be used to provide the amine reactive compound including combinations of different materials. Desirable amine reactive compounds are those materials that can readily form reaction products with amines at or below room temperature (about 20° to 22° C.) so as to provide a composition such as an adhesive that can be easily used and cured under ambient conditions. General classes of useful amine reactive compounds include acids, anhydrides and aldehydes. Isocyanates, acid chlorides, sulfonyl chlorides, and the like such as isophorone diisocyanate, toluene diisocyanate and methacryloyl chloride may also be used.

Any acid that can liberate the organoborane by salting the amine group may be employed. Useful acids include Lewis acids (e.g., $SnCl_4$, $TiCl_4$ and the like) and Bronsted acids (e.g., carboxylic acids, HCl, $H_2SO_4$, $H_3PO_4$, phosphonic acid, phosphinic acid, silicic acid, and the like). Useful carboxylic acids include those having the general formula $R^{20}$—COOH, where $R^{20}$ is hydrogen, an alkyl group of 1 to 8 and preferably 1 to 4 carbon atoms, or an aryl group of 6 to 10, preferably 6 to 8 carbon atoms. The alkyl groups may comprise a straight chain or they may be branched. They may be saturated or unsaturated. The aryl groups may contain substituents such as alkyl, alkoxy or halogen moieties. Illustrative acids of this type include acrylic acid, methacrylic acid, acetic acid, benzoic acid, and p-methoxybenzoic acid.

If it is desirable to provide a polymerizable system that has less odor, an alkenyl group having a larger number of carbon atoms is recommended. In this event, $R^{20}$ may be a straight or branched chain, saturated or unsaturated alkenyl group of at least 9 carbon atoms, more preferably at least about 11 carbon atoms, and most preferably at least about 15 carbon atoms.

Other carboxylic acids useful as the amine reactive compound include mono, di, tri (etc.)-carboxylic acids and their partially esterified derivatives (e.g. itaconic acid and itaconic mono(butyl) ester). Such compounds may be represented by the following general structure:

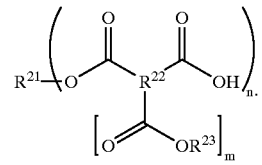

$R^{21}$ is hydrogen, a monovalent organic group (preferably having about 18 atoms or less, more preferably about 8 atoms or less), or a multivalent organic group (preferably having about 30 atoms or less, more preferably about 10 atoms or less). $R^{22}$ is multi-valent organic group (preferably having about 8 atoms or less, more preferably about 4 atoms or less). $R^{23}$ is hydrogen or a monovalent organic group (preferably having about 18 atoms or less, more preferably about 8 atoms or less). The integral value of "m" is 0, 1 or 2, and the integral value of "n" is greater than or equal to one, preferably 1 to 4, more preferably 1 or 2.

More preferably m is 0 so as to yield carboxylic acids represented by the following general structure:

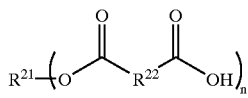

wherein $R^{21}$, $R^{22}$, and n are as previously defined.

The "organic groups" referred to in conjunction with $R^{21}$, $R^{22}$ and $R^{23}$ may be an aliphatic group (which may be saturated or unsaturated, and linear or branched), a cycloaliphatic group, an aromatic group, or an oxygen-, nitrogen-, or sulfur-containing heterocyclic group. When $R^{21}$ is hydrogen, m is zero, and n is one, the resulting compounds are dicarboxylic acids, useful examples of which include: itaconic acid, oxalic acid, malonic acid, succinic acid, glutaric acid, adipic acid, maleic acid, fumaric acid, phthalic acid, isophthalic acid, and terephthalic acid. When, $R^{21}$ is an aliphatic group, n is one, and m is zero, the resulting compounds are carboxylic acid esters, useful examples of which include: 1,2-ethylene bismaleate; 1,2-propylene bismaleate; 2,2'-diethyleneglycol bismaleate; 2,2'-dipropyleneglycol bismaleate; and trimethylolpropane trismaleate.

Also preferred as the amine reactive compound are materials having at least one anhydride group, such materials preferably having one of the following structures:

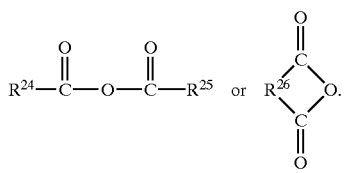

$R^{24}$ and $R^{25}$ are organic radicals that independently may be aliphatic (which may be saturated or unsaturated, and linear or branched), cycloaliphatic, or aromatic. Preferred aliphatic groups comprise 1 to 17 carbon atoms, more preferably 2 to 9 carbon atoms. Preferred aromatic groups include benzene, which may be substituted with 1 to 4 carbon atom aliphatic groups.

$R^{26}$ is a divalent organic radical that completes a cyclic structure with the anhydride group to form, for example, a 5- or 6-membered ring. $R^{26}$ may be substituted with aliphatic, cycloaliphatic or aromatic groups, preferably aliphatic groups comprising 1 to 12, more preferably 1 to 4 carbon atoms. $R^{26}$ may also contain heteroatoms such as oxygen or nitrogen provided that any heteroatom is not adjacent to the anhydride functionality. $R^{26}$ may also be part of a cycloaliphatic or aromatic fused ring structure, either of which may be optionally substituted with aliphatic groups. The presence of a free-radically polymerizable group in the anhydride-functional amine reactive compound may permit the same to polymerize with the (meth)acrylic monomers. Useful examples of anhydrides include: propionic anhydride, methacrylic anhydride, crotonic anhydride, butyric anhydride, isobutyric anhydride, valeric anhydride, trimethylacetic anhydride, hexanoic anhydride, heptanoic anhydride, decanoic anhydride, lauric anhydride, stearic anhydride, oleic anhydride, benzoic anhydride, succinic anhydride, methylsuccinic anhydride, isobutenylsuccinic anhydride, 2,2-dimethylsuccinic anhydride, itaconic anhydride, maleic anhydride, citraconic anhydride, 2,3-dimethylmaleic anhydride, 2-octen-1-ylsuccinic anhydride, 2-dodecen-1-ylsuccinic anhydride, glutaric anhydride, 3-methylglutaric anhydride, 3,3-dimethylglutaric anhydride, 3-ethyl-3-methylglutaric anhydride, 2-phenylglutaric anhydride, diglycolic anhydride, ethylenediaminetetraacetic dianhydride, and poly(styrene-co-maleic anhydride), cyclohexanedicarboxylic anhydride, cis-1,2,3,6-tetrahydrophthalic anhydride, hexahydro-4-methylphthalic anhydride, cis-5-norbornene-endo-2,3-dicarboxylic anhydride, methyl-5-norbornene-2,3-dicarboxylic anhydride, exo-3,6-epoxy- 1,2,3,6-tetrahydrophthalic anhydride, 3,3-tetramethyleneglutaric anhydride, phthalic anhydride, 4-methylphthalic anhydride, 1,8-naphthalic anhydride, diphenic anhydride, and homophthalic anhydride.

Aldehydes useful as the amine-reactive compound have the formula:

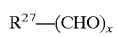

where $R^{27}$ is a monovalent organic radical, such as is an alkyl group of 1 to 10 carbon atoms (preferably 1 to 4), or an aryl group having 6 to 10 carbon atoms (preferably 6 to 8), and x is 1 or 2 (preferably 1). In this formula, the alkyl groups may be straight or branch-chained, and may contain substituents such as halogen, hydroxy and alkoxy. The aryl groups may contain substituents such as halogen, hydroxy, alkoxy, alkyl and nitro. The preferred $R^{27}$ group is aryl. Illustrative examples of compounds of this type include, benzaldehyde, o-, m- and p-nitrobenzaldehyde, 2,4-dichlorobenzaldehyde, p-tolylaldehyde and 3-methoxy-4 hydroxybenzaldehyde. Blocked aldehydes such as acetals may also be used in this invention.

The decomplexer is employed in an effective amount (i.e., an amount effective to promote polymerization by liberating the initiator from its complexing agent, but without materially adversely affecting desired properties of the ultimate polymerized composition). As recognizable to one of ordinary skill in the art, too much of the decomplexer may cause polymerization to proceed too quickly and, in the case of adhesives, the resulting materials may demonstrate inadequate adhesion to low energy surfaces. However, if too little decomplexer is used, the rate of polymerization may be too slow and the resulting polymers may not be of adequate molecular weight for certain applications. A reduced amount of decomplexer may be helpful in slowing the rate of polymerization if it is otherwise too fast. Thus, within these parameters, the decomplexer is typically provided in an amount such that the ratio of amine-, amidine-, hydroxide- or alkoxide-reactive groups in the decomplexer(s) to amine, amidine, hydroxide or alkoxide groups in the complexing agent(s) is in the range of 0.5:1.0 to 3.0:1.0. For better performance, preferably the ratio of amine-, amidine-, hydroxide- or alkoxide-reactive groups in the decomplexer(s) to amine, amidine, hydroxide or alkoxide groups in the complexing agent(s) is in the range of 0.5:1.0 to 1.0:1.0, preferably about 1.0:1.0.

Vinyl Aromatic Compounds:

In some embodiments, the polymerizable system of the present invention additionally includes a vinyl aromatic compound. Preferred vinyl aromatic compounds are reported in a copending application having the U.S. application Ser. No. 09/525,368, filed Mar. 15, 2000. A "vinyl aromatic compound" refers to an organic compound according to general formula (1) or general formula (2) or a mixture thereof:

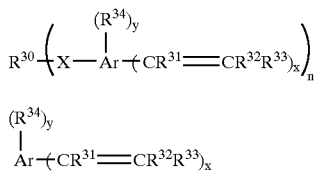

(1)

(2)

In formula (1), n represents an integer having a value of 1 or greater, preferably 2 or greater. In formula (1) and formula (2), Ar represents a substituted aryl group, preferably having from 6–10 carbon atoms. Examples of Ar include a substituted benzene group having the formula $C_6H_{5-x-y}$ for formula (1) or $C_6H_{6-x-y}$ for formula (2) or a substituted napthalene group having the formula $C_{10}H_{7-x-y}$ for formula (1) or $C_{10}H_{8-x-y}$ for formula (2). Most preferably, Ar is a substituted benzene group.

In the vinyl aromatic compounds of formulas (1) and (2), the $-CR^{31}=CR^{32}R^{33}$ group provides a site of unsaturation (i.e., a double bond) which is reactive with the polymerizable monomer of the polymerizable system. That is, the vinyl aromatic compound copolymerizes with the polymerizable monomer and becomes chemically attached to the polymerizable monomer. In formula (1) and (2), subscript x, which represents an integer having a value of 1 or greater, represents the number of unsaturated moieties bonded to each Ar group in the vinyl aromatic compound. In a preferred embodiment of formula (1), x is 1.

In formulas (1) and (2), $R^{31}$, $R^{32}$ and $R^{33}$ are independently selected from the group consisting of hydrogen, alkyl, aryl and halogen. Preferably, $R^{31}$ is selected from the group consisting of hydrogen and methyl and $R^{32}$ and $R^{33}$ are hydrogen. To avoid gelling, it is generally preferred that vinyl aromatic compounds of formulas (1) and (2) having $R^{31}$=H, are packaged separate from the organoborane (e.g., included only in part B) in two part polymerizable systems of the present invention.

In formulas (1) and (2), $R^{34}$ represents a non-hydrogen substituent bonded to the aryl group Ar. Subscript y is an integer having a value of 0 or greater which represents the number of individual substituents bonded to the aryl group Ar. When y is equal to 1 or greater, each substituent $R^{34}$ may be independently selected from the group consisting of alkyl, alkoxy, alkanoyl, alkanoyloxy, aryloxy, aroyl, aroyloxy and halogen. Preferably, y is equal to 0 in formula (1).

In formula (1), X represents either a divalent organic linking group or a covalent bond. In a preferred embodiment, X is a divalent organic linking group comprising a urethane or a urea functional group. In a more preferred embodiment, X is:

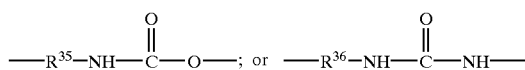

wherein $R^{35}$ and $R^{36}$ are divalent organic linking groups having from 1–10 carbon atoms. If present, $R^{35}$ and $R^{36}$ are bonded to the aryl group (Ar) of formula (1).

In formula (1), $R^{30}$ represents an organic group, preferably an oligomeric or polymeric organic group. The molecular weight of $R^{30}$-Xn is 100 or greater, more preferably 200 or greater, and most preferably 500 or greater. Representative examples of polymeric organic groups include hydrocarbon polymers (e.g., polyethylene, polystyrene, polypropylene, and polymethylpentene), carbon chain polymers (e.g., polyvinyl chloride, polyvinylidene chloride, and polyacrylonitrile), heterochain polymers (e.g., polyethers, polyamides, polyesters, polyurethanes, polysulfides, polysulfone, and polyimide). Suitable polymeric organic groups may be homopolymers or copolymers, for example, copolymers and terpolymers and may be alternating, random, block, or graft in structure. Preferred organic groups $R^{30}$ include polyesters (e.g., polycaprolactone) having a molecular weight ranging from about 300–1000 (grams/mole) and polyethers having a molecular weight ranging from about 500–3000 (grams/mole).

Preferred monofunctional vinyl aromatic compounds of formula (1) are represented below in general formula (1A) wherein, with reference to formula (1), Ar is a benzene ring, y is 0, $R^{31}$ is methyl, $R^{32}$ and $R^{33}$ are hydrogen, x is 1, and n is 1. The adhesive structure to the benzene ring is shown generally and may be ortho, meta or para.

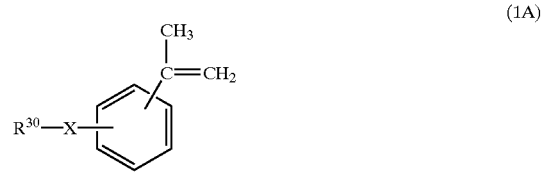

Representative examples of monofunctional vinyl aromatic compounds of formula (1A) include:

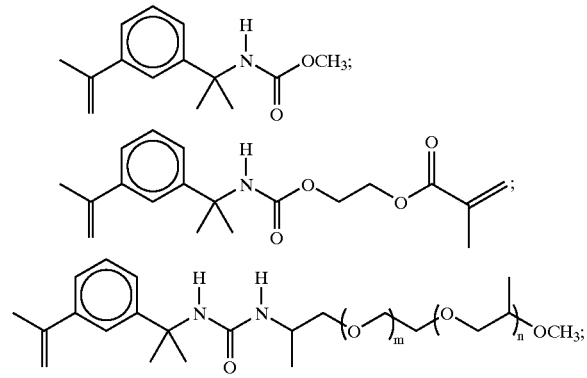

wherein m typically ranges from about 0 to 50; and
n typically ranges from about 0 to 48.
In one embodiment, for example, m is equal to 6 and n is equal to 38.

Preferred difunctional vinyl aromatic compounds of formula (1) are represented below in general formula (1B) wherein, with reference to formula (1), Ar is a benzene ring, y is 0, $R^{31}$ is methyl, $R^{32}$ and $R^{33}$ are hydrogen, x is 1, and n is 2. The adhesive structure to the benzene rings is shown generally and may be independently on each ring ortho, meta or para.

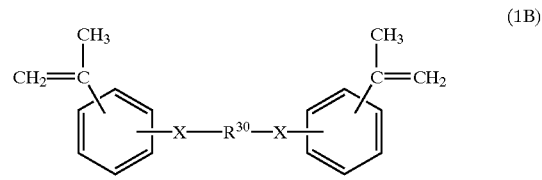

Representative examples of difunctional vinyl aromatic compounds of formula (1B) include:

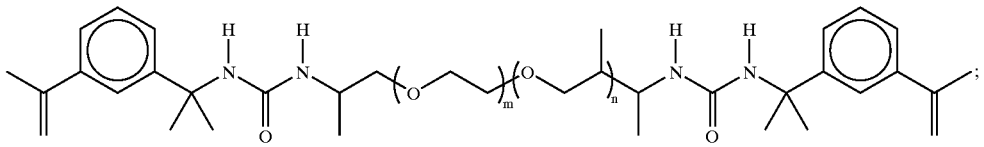

wherein m typically ranges from about 0 to 50; and n typically ranges from about 0 to 50;

wherein (n+m) typically ranges from about 2 to 18.

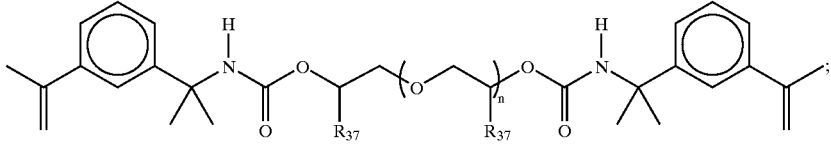

wherein n typically ranges from about 0 to 140; and
$R_{37}$ is methyl or hydrogen.

Preferred trifunctional vinyl aromatic compounds of formula (1) are represented below as general formula (1C) wherein, with reference to formula (1), Ar is a benzene ring, y is 0, $R^{31}$ is methyl, $R^{32}$ and $R^{33}$ are hydrogen, x is 1, and n is 3. The adhesive structure to the benzene rings is shown generally and may be independently on each ring ortho, meta or para.

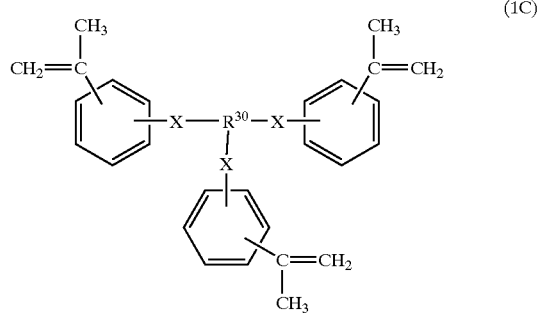

(1C)

Representative examples of the trifunctional vinyl aromatic compounds of formula (1C) include:

Useful vinyl aromatic compounds of general formula (1) may be prepared, for example, by reacting 3-isopropenyl-α,α-dimethylbenzyl isocyanate (commerically available under the trade designation "TMI" from Cytec Industries, West Peterson, N.J.) with a mono- or multi-functional reactive hydrogen compound, preferably a mono- or multi-functional amine, alcohol or combination thereof. Particularly preferred mono- and multi-functional amines include the amine terminated polyethers commercially available under the trade designation "JEFFAMINE" (from Huntsman Chemical Co., Houston, Tex.) for example "JEFFAMINE ED600" (a diamine terminated polyether having a reported molecular weight of 600) "JEFFAMINE D400" (a diamine terminated polyether having a reported molecular weight of 400), "JEFFAMINE D2000" (a diamine terminated polyether having a reported molecular weight of 2000), "JEFFAMINE T3000" (a triamine terminated polyether having a reported molecular weight of 3000), and "JEFFAMINE M2005" (a monoamine terminated polyether having a reported molecular weight of 2000). Suitable alcohol-containing compounds include, for example, polypropylene glycol, polycaprolactone triol, and diethylene glycol.

Representative examples of vinyl aromatic compounds of formula (2) include:

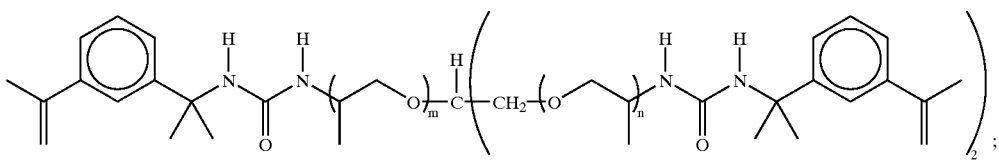

wherein (n+m) typically ranges from about 5 to 85;

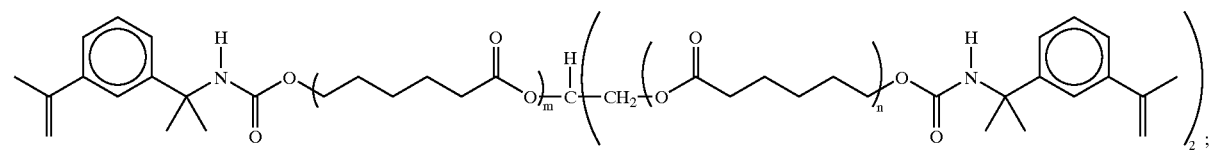

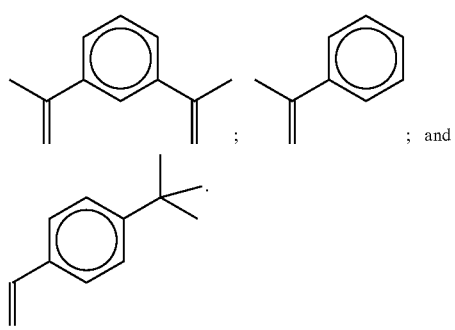

Polymerizable Monomers:

Polymerizable systems of the present invention include at least one polymerizable monomer. Broadly, the polymerizable monomer in a polymerizable system of the present invention includes at least one ethylenically unsaturated monomer capable of free radical polymerization. Numerous compounds containing ethylenic unsaturation can be used in 4 the polymerizable system. The polymerizable monomer assists in the determination of the polymerizable system characteristics. Depending on the monomer, the polymerizable system may be an adhesive, a coating, a pressure sensitive adhesive or a sealant. Preferably, the composition includes at least one (meth)acrylic monomer (referring to both acrylic and methacrylic), most preferably at least one methacrylic monomer. Particularly preferred are (meth) acrylic acid derivatives, such as those including esters and/or amides. For example, the (meth)acrylic esters of monohydric alcohols, particularly alkanols having from 1 to 12 carbon atoms, such as methyl (meth)acrylate, ethyl (meth)acrylate, butyl (meth)acrylate, n-hexyl (meth) acrylate, cyclohexyl (meth)acrylate, isooctyl (meth)acrylate, isobomyl (meth)acrylate, isodecyl (meth)acrylate, ethylhexyl (meth)acrylate; the (meth)acrylic esters of monohydric alcohols further including heteroatoms, such as tetrahydrofurfuryl (meth)acrylate and 2-ethoxyethyl (meth) acrylate; the (meth)acrylic acid esters of polyhydric alcohols, such as ethylene glycol, diethylene glycol, polyethylene glycol, trimethylol propane, triethylene glycol, tetraethylene glycol, dipropylene glycol, tripropylene glycol, tetrapropylene glycol, pentapropylene glycol and polypropylene glycol; ethoxylated or propoxylated diphenylolpropane and hydroxy-terminated polyurethanes, and mixtures thereof are all suitable. In one embodiment, the polymerizable monomer comprises a mixture of tetrahydrofurfuryl (meth)acrylate and ethylhexyl (meth)acrylate. (Meth)acrylic acid esters of polyhydric alcohols are hereinafter referred to as oligomeric (meth)acrylates.

Basically suitable are also polymerizable monomers, such as vinyl acetate; vinyl halides, such as vinyl chloride, vinyl fluoride, and vinyl bromide. These compounds, however, are generally used only in subordinate amounts in the polymerizable systems.

Further suitable polymerizable monomers are amide derivatives of (meth)acrylic acid; such as acrylamide; N,N-dimethyl(meth)acrylamide; N-ethyl(meth)acrylamide; N,N-diethyl(meth)acrylamide; N-isopropyl(meth)acrylamide; N-butyl(meth)acrylamide; N-t-butyl(meth)acrylamide; N,N-dibutyl(meth)acrylamide; N-phenyl(meth)acrylamide; N-((meth)acryloyl)morpholine; N-((meth)acryloyl)piperidine; N-(1,1-dimethyl-3-oxobutyl) (meth)acrylamide; N-1,1,3,3-tetramethylbutyl(meth)acrylamide; methylene-bis-(meth)acrylamide; tetramethylene-bis-(meth) acrylamide; trimethylhexamethylene-bis-(meth)acrylamide; tri(meth)acryloyldiethylenetriamine; and similar compounds. Preferred acid amides include N,N-dimethyl(meth) acrylamide; N,N-diethyl(meth)acrylamide; N-butyl (meth) acrylamide; N,N-dibutyl(meth)acrylamide; N-((meth) acryloyl)morpholine; and N-((meth)acryloyl)piperidine.

In general, the emphasis is on monomers with one or two olefinic double bonds in the molecule, preferably one olefinic double bond. The additional use of higher unsaturated components is not excluded, but it must be kept in mind that their presence may adversely affect work-life and/or physical performance.

Work-life Extending Agent

Polymerizable systems of the present invention comprise a work-life extending agent. The work-life extending agent is independently selected from the following structures and combinations thereof.

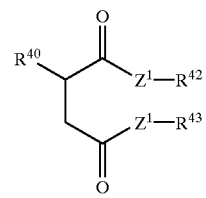

Wherein $R^{40}$ is $CH_2=$ or alkenyl. As used herein, the term "alkenyl" refers to a linear or branched hydrocarbon radical having from one to twelve carbons and at least one carbon—,—carbon double bond. Generally, the carbon—,—carbon double bond originates within 2 carbons of the alpha carbon (i.e. the carbon atom adjacent to a carbonyl group). Examples of suitable alkenyls include vinyl, allyl, isobutenyl, 2-octene-1-yl, 2-dodecene-1-yl. $Z^1$ and $Z^2$ are independently selected from O, S or N–$R^{41}$. $R^{41}$, $R^{42}$ and $R^{43}$ are independently selected from hydrogen, aryl, alkyl or cycloalkyl. The term "alkyl" means a straight or branched hydrocarbon radical having from 1 to 12 carbon atoms unless otherwise specified and includes, for example, methyl, ethyl, n-propyl, isopropyl, n-butyl, sec-butyl, isobutyl, tert-butyl, allyl, n-pentyl, n-hexyl, n-heptyl, n-octyl, n-nonyl, n-decyl, undecyl, and dodecyl. The term "cycloalkyl" means a saturated hydrocarbon ring which contains from 3 to 12 carbon atoms unless otherwise specified, for example, cyclopropyl, cyclobutyl, cyclopentyl, cyclohexyl, cycloheptyl, and adamantyl. The aryl may be fused or unfused. Examples of suitable aryls include phenyl, biphenyl and naphthyl.

The work-life extending agent may also be the following structure.

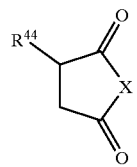

Wherein X is O, S, or N—$R^{50}$. $R^{44}$ is $CH_2=$ or alkenyl as defined above. $R^{50}$ is hydrogen, aryl, alkyl or cycloalkyl as defined above.

Examples of suitable work-life extenders include itaconic acid, isobutenyl succinic acid, allyl succinic acid, 2-octene-1-yl succinic acid, 2-dodecene-1-yl succinic acid, derivatives or closed ring derivatives thereof and combinations thereof. Derivatives and closed ring derivatives include anhydrides, mono(alkyl) esters, di(alkyl) esters, imides, thioimides, amide esters, amide acids or diamides of any of these, and combinations thereof.

In certain embodiments, the work-life extending agent is selected from itaconic acid, itaconic acid derivatives, or a combination thereof. Examples of the derivatives of itaconic acid include itaconic anhydride, esters, diesters, amidoesters, amides, diamides, imides and thioimides, such as itaconic anhydride, mono(alkyl) itaconate, di(alkyl) itaconate, itaconic imide, itaconic diamide, itaconic amide acid, itaconic amide ester, itaconic thioimide, itaconic thiol acid, itaconic mono(alkyl) thiol ester, itaconic di(alkyl) thiol ester and combinations thereof. The alkyl group in the esters may be any alkyl group, for example methyl, ethyl, propyl, butyl, and so on.

The work-life extending agent is used in an effective amount that enhances work-life while it does not materially, adversely affect the ultimate properties of the polymerized composition (for example, adhesion), depending on the intended use. Generally, the work-life extending agent is present to provide a ratio of vinyl equivalents in the work-life extending agent to the total vinyl equivalents of about 0.03 to about 0.25. As used herein, the term "vinyl equivalents" means the number of polymerizable double bonds, either in $R^{40}$ or $R^{44}$ of the work-life extending agent or in the total composition. One specific embodiment has at least 2.5 weight percent of itaconic (di)butyl ester, for example between about 5 and about 10 weight percent of itaconic di(butyl) ester, in a specific embodiment about 8 weight percent of itaconic di(butyl) ester corresponding to a ratio of about 0.052 to about 0.107. Specific work-life extending agents which may also be used as a decomplexer may be present in such an amount so that the ratio of amine-, amidine-, hydroxide- or alkoxide-reactive groups in the work-life extending agent to amine, amidine, hydroxide or alkoxide groups in the complexing agent(s) is over 3.0:1.0.

Polymerizable systems of the present invention retain at least 85% or greater, more preferably 90% or greater, and most preferably 95% or greater overlap shear strength at a longer open time than the polymerizable system without the work-life extending agent (see Work-life Test Method).

Specific embodiments of suitable work-life extending agents include:

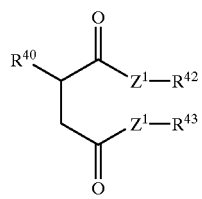

wherein $R^{40}$ is $CH_2=$ or alkenyl, $Z^1$ and $Z^2$ are independently O, N—$R^{41}$ or S, and $R^{41}$, $R^{42}$ and $R^{43}$ are independently H, alkyl, aryl or cycloalkyl, provided that when $Z^1$ and $Z^2$ are O, $R^{42}$ and $R^{43}$ are independently alkyl, aryl or cycloalkyl;

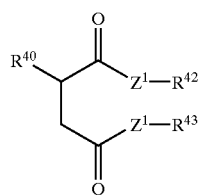

wherein $R^{40}$ is $CH_2=$ or alkenyl, $Z^1$ and $Z^2$ are independently N—$R^{41}$ or S, and $R^{41}$, $R^{42}$ and $R^{43}$ are independently H, alkyl, aryl or cycloalkyl;

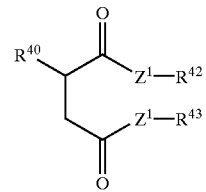

wherein $R^{40}$ is $CH_2=$ or alkenyl, $R^{42}$ is H or alkyl, $R^{43}$ is H, and $Z^1$ and $Z^2$ are O and the ratio of amine-, amidine-, hydroxide- or alkoxide-reactive groups in the work-life extending agent to amine, amidine, hydroxide or alkoxide groups in the complexing agent(s) is over 3.0:1.0;

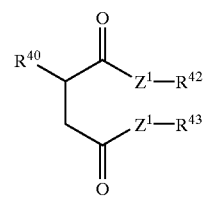

wherein $R^{40}$ is $CH_2=$ or alkenyl, $Z^1$ is O, N—$R^{41}$ or S, $Z^2$ is O, $R^{41}$ is H, alkyl, aryl or cycloalkyl, $R^{42}$ is H or alkyl, and $R^{43}$ is H, and the ratio of amine-, amidine-, hydroxide- or alkoxide-reactive groups in the work-life extending agent to amine, amidine, hydroxide or alkoxide groups in the complexing agent(s) is over 3.0:1.0;

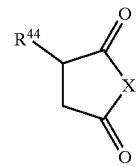

wherein $R^{44}$ is $CH_2=$ or alkenyl and X is S or N—$R^{50}$, where $R^{50}$ is hydrogen, alkyl, aryl or cycloalkyl; and

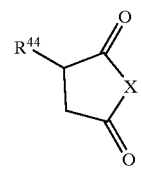

wherein $R^{44}$ is $CH_2=$ or alkenyl and X is O and ratio of anhydride groups in the work-life extending agent to amine, amidine, hydroxide or alkoxide groups in the complexing agent(s) is over 3.0:1.0

Additives:

Polymerizable systems of the present invention may further comprise optional additives. One additive is a thickener, such as medium (i.e., about 40,000) molecular weight polybutyl methacrylate that may generally be incorporated in an amount of up to about 50%-wt., based on the total weight of the polymerizable monomer. Thickeners may be employed to increase the viscosity of the resulting polymerizable system to a more easily applied viscous syrup-like consistency.

Another additive is an elastomeric material. These materials can improve the fracture toughness of polymerizable systems made therewith, which can be beneficial when, for example, bonding stiff, high yield strength materials (e.g., metal substrates that do not mechanically absorb energy as easily as other materials, such as flexible polymeric substrates). Such additives can generally be incorporated in an amount of up to about 50 %-wt., based on the total weight of the polymerizable system.

Core-shell polymers can also be added to modify spreading and flow properties of the polymerizable system. These enhanced properties may be manifested by a reduced tendency for the polymerizable system to leave an undesirable "string" upon dispensing from a syringe-type applicator, or sag or slump after having been applied to a vertical surface. Accordingly, use of more than about 20%-wt., based on total weight of the polymerizable system, of a core-shell polymer additive may be desirable for achieving improved sag-slump resistance. Core-shell polymers can also improve the fracture toughness of polymerizable systems made therewith, which can be beneficial when, for example, bonding stiff, high yield strength materials (e.g., metal substrates that do not mechanically absorb energy as easily as other materials, such as flexible polymeric substrates).

Reactive diluents may also be added to polymerizable systems of the present invention. Suitable reactive diluents include 1,4-dioxo-2-butene functional compounds as reported in U.S. Ser. No. 09/272,152 (Moren) and aziridine functional compounds as reported in U.S. Pat. No. 5,935,711 (Pocius et al.), the disclosures of which are incorporated herein by reference. In a specific embodiment, the diluent is a diamine, such as those sold under the tradename JEFFAMINE D-2000, a polyoxypropylene diamine, nominal molecular weight of 2000, available from Huntsman Chemical Co., Houston, Tex.

Small amounts of inhibitors, such as hydroquinone monomethyl ether may be used in the polymerizable systems, for example, to prevent or reduce degradation of the polymerizable monomers during storage. Inhibitors may be added in an amount that does not materially affect the rate of polymerization or the ultimate properties of polymers made therewith. Accordingly, inhibitors are generally useful in amounts of about 100–10,000 ppm based on the total weight of the polymerizable monomers in the polymerizable system.

Other possible additives include non-reactive colorants, fillers (e.g., carbon black, hollow glass/ceramic beads, silica, titanium dioxide, solid glass/ceramic spheres, electrically and/or thermally conductive particulate, antistatic compounds, and chalk), and the like. The various optional additives are employed in any amount, but generally amounts that do not significantly adversely affect the polymerization process or the desired properties of polymers made therewith.

Polymerizable systems of the invention are especially useful for adhesively bonding low surface energy plastic or polymeric substrates that historically have been very difficult to bond without using complicated surface preparation techniques, for example, priming. By low surface energy substrates is meant materials that have a surface energy of less than 45 mJ/m$^2$, more typically less than 40 mJ/m$^2$ or less than 35 mJ/m$^2$. Included among such materials are polyethylene, polypropylene, acrylonitrile-butadiene-styrene, and fluorinated polymers such as polytetrafluoroethylene (TEFLON), which has a surface energy of less than 20 mJ/m$^2$. (The expression "surface energy" is often used synonymously with "critical wetting tension" by others.) Other polymers of somewhat higher surface energy that may be usefully bonded with the compositions of the invention include polycarbonate, polymethylmethacrylate, and polyvinylchloride.

The polymerizable systems of the invention can be easily provided as two-part formulations. The (meth)acrylic monomers are blended as would normally be done when working with such materials. The polymerizable systems of the present invention are preferably provided in two-part formulation with the parts being mixed prior to application of the polymerizable system to a substrate. In this way, the polymerizable monomers may be separated from the organoborane initiator until cure (i.e., polymerization) of the polymerizable system is desired. Accordingly, the first part or "Part A" of the two-part polymerizable system comprises an organoborane initiator (preferably a complexed organoborane initiator) and may further comprise optional additives, for example, a reactive diluent or plasticizer. The second part or "Part B" of the two-part polymerizable system comprises at least one polymerizable monomer, and further comprises a decomplexer in the case where the organoborane initiator in Part A is complexed (e.g., an organoborane amine complex). Part B may further comprise optional additives, for example, microspheres or a core-shell polymer. Generally, in the polymerizable systems of the present invention, the work-life extending agent is included in Part B, for example if the work-life extending agent also acts as a decomplexer.

For a two-part polymerizable system such as those of the invention to be most easily used in commercial and industrial environments, the ratio at which the two parts are combined should be a convenient whole number. This facilitates application of the polymerizable system with conventional, commercially available dispensers. Such dispensers are shown in U.S. Pat. Nos. 4,538,920 and 5,082,147 and are available from ConProTec, Inc. (Salem N.H.) under the tradename "MIXPAC" and are sometimes described as dual syringe-type applicators.

Typically, these dispensers use a pair of tubular receptacles arranged side-by-side with each tube being intended to receive one of the two parts of the polymerizable system. Two plungers, one for each tube, are simultaneously advanced (e.g., manually or by a hand-actuated ratcheting mechanism) to evacuate the contents of the tubes into a common, hollow, elongated mixing chamber that may also contain a static mixer to facilitate blending of the two parts. The blended polymerizable system is extruded from the mixing chamber onto a substrate. Once the tubes have been emptied, they can be replaced with fresh tubes and the application process continued.

The ratio at which the two parts of the polymerizable system are combined is controlled by the diameter of the tubes. (Each plunger is sized to be received within a tube of fixed diameter, and the plungers are advanced into the tubes at the same speed.) A single dispenser is often intended for use with a variety of different two-part polymerizable systems and the plungers are sized to deliver the two parts of the polymerizable system at a convenient mix ratio. Some common mix ratios of Part A to Part B are 1:1, 1:2, 1:4 and 1:10.

If the two parts of the polymerizable system are combined in an odd mix ratio (e.g. 3.5:100), then the ultimate user would probably manually weigh the two parts of the polymerizable system. Thus, for best commercial and industrial utility and for ease of use with currently available dispensing equipment, the two parts of the polymerizable system should be capable of being combined in a common, whole number mix ratio such as 1:10 or less, more preferably 1:4, 1:3, 1:2 or 1:1. Polymerizable systems of the invention are suited for use with conventional, commercially available dispensing equipment for two-part adhesives.

Once the two parts have been combined, the polymerizable system should preferably be used within a period of time less than or equal to the work-life of the polymerizable system. The polymerizable system is applied to one or both substrates and then the substrates are joined together with pressure to force excess composition out of the bond line. This also has the advantage of displacing any polymerizable system that has been exposed to air and that may have advanced too far in cure. In general, the bonds should be made shortly after the composition has been applied to the substrate, preferably within a period of time less than or equal to the work-life of the polymerizable system. The typical bond line thickness is about 0.1 to 0.3 mm but may exceed 1.0 mm when gap filling is needed. The bonding process can easily be carried out at room temperature and to improve the degree of polymerization it is desirable to keep the temperature below about 40° C., preferably below 30° C. and most preferably below 25° C. Full strength will be reached in about 24 hours under ambient conditions. Post-curing at an elevated temperature may also be used if desired.

The invention will be more fully appreciated with reference to the following non-limiting examples.

EXAMPLES

Test Method

Work-life

The test specimens used were similar to that described in ASTM D-1002, except they had nominal dimensions of 4.0×1.0×0.125 inches (10.2×2.5×0.025 cm). The test substrate was high density polyethylene (HDPE, available from Cadillac Plastics Co., Minneapolis, Minn.), which was used as received. A bead of the polymerizable system, approximately 0.125 inches (0.32 cm) thick, was extruded at room temperature onto the surface (across the width, about 0.25 inches (0.6 centimeters) from one end) of a test coupon using a dual syringe applicator. After various lengths of time, as reported in the examples, were allowed to elapse the beaded test coupon was mated to a second test coupon, which was placed against the first such that an overlap area measuring 0.5×1.0 inches (1.3×2.5 cm) was formed. The two coupons were clamped together and allowed to cure at room temperature (72–75° F. (22–24° C.)) for a minimum of 24 hours prior to testing. The overlap shear strength was measured using an MTS Sintech tensile tester (Model 5/GL, available from Sintech, a division of MTS Systems Corporation, Research Triangle Park, N.C. ) at room temperature using a crosshead speed of 0.5 inches/minute (1.3 cm/minute). Three samples were evaluated and used to obtain an average value. Maximum overlap shear values were recorded in pounds and converted into pounds/square inch (psi) and megaPascals (MPa). The failure mode was also recorded. The failure modes were designated as follows. SY indicates that substrate yielding was observed; CF indicates a cohesive failure mode; AF indicates an adhesive failure mode, this was observed in those samples where a "skinning" of the exposed adhesive composition occurred prior to joining of the two test coupons together; and MM indicates a mixed mode of failure in which both cohesive failure and random adhesive failure modes were observed. Of these, substrate yielding and cohesive failure are desired since they indicate a bond stronger than the substrate tensile strength or a bond stronger than the internal strength of the adhesive respectively. Adhesive failure and mixed mode failure are not desired since they indicate a weak bond strength between the adhesive layer and the substrate.

Glossary

| Abbreviation | Description |
| --- | --- |
| AMSPU | a-methylstyrene-polyurea oligomer (prepared as Oligomer B, described in Table 1, of U.S. Application No. 09/525,368, filed March 15, 2000. |
| B360 | Core/shell rubber modifier, available as Blendex ™ 360 from General Electric Specialty Chemicals, Parkersburg, WV. |
| CN-965 | Aliphatic Urethane Diacrylate, available from Sartomer Company, Inc., Exton, PA. |
| CX100 | Trimethylolpropane tris(3-(2-methylaziridino))propionate, available as Crosslinker CX-100 from Zeneca Resins, Wilmington, MA. |
| D2000 | Jeffamine D-2000, polyoxypropylene diamine, nominal molecular weight of 2000, available from Huntsman Chemical Co., Houston, TX |
| DBF | Dibutyl fumarate ester, available from Aldrich Chemical Co., Milwaukee, WI. |
| DBI | Dibutyl itaconate ester, available from Aldrich Chemical Co., Milwaukee, WI. |
| DBM | Dibutyl maleate ester, available from Aldrich Chemical Co., Milwaukee, WI. |
| DMI | Dimethyl itaconate ester, available from Aldrich Chemical Co., Milwaukee, WI. |
| 2EHMA | 2-Ethylhexyl methacrylate, available from Aldrich Chemical Co., Milwaukee, WI. |
| ItaAnh | Itaconic anhydride, available from Aldrich Chemical Co., Milwaukee, WI. |
| MBI | Monobutyl itaconate acid ester, available from Monomer-Polymer and Dajac Labs, Inc., Feasterville, PA. |
| NKEster | 2-Methacryloyloxyethyl succinate, available as NK Ester SA from Shin-Nakamura, Wakayama City Japan. |
| NPAL | FIRSTCURE ® NPAL polymerization inhibitor, available from ChemFirst Fine Chemicals, Pascagoula, MS. |
| Paraplex G40 | Polyester adipate, available from The C.P. Hall and Co., Bedford Park, IL. |
| SucAnh | Succinic anhydride, available from Aldrich Chemical Co, Milwaukee, WI. |
| TEB-HMDA | A complex of 2 moles of triethylborane and 1 mole of hexamethylene diamine prepared as described in U.S. Pat. No. 5,616,796 at Column 21, line 49-Column 22, line 36. |
| ThFMA | Tetrahydrofurfuryl methacrylate, available as SR 203 from Sartomer Co., Inc., Exton, PA. |
| TiO2 | Titanium dioxide filler, available as P25 from DeGussa Corporation, Pigment Group, Ridgefield Park, NJ. |
| Cab-O-Sil TS720 | Fumed silica, available from Cabot Corporation, Cab-O-Sil Division, Tuscola, IL. |
| G3500 | Ceramic microspheres, 100–350 micrometers in diameter, available as Z-Light ™ G3500 from 3M Company, St. Paul, MN. |
| W1600 | Ceramic microspheres, 100–350 micrometers in diameter, available as Z-Light ™ W1600 from 3M Company, St. Paul, MN. |

General Preparation of Adhesive Composition Parts A and B

All amounts are given in parts by weight (pbw) in the respective Part (A or B) unless otherwise noted.

Part A (Initiator Side)

Samples were prepared on a 200 gram scale in a 600 milliliter (mL) stainless steel beaker which was positioned inside a dessicator (no dessicant) and held in place with a foam collar fitted around the middle of the beaker. The dessicator was fitted with a silicone rubber gasket and an aluminum alloy cover plate through which a stainless steel shaft passed. The shaft was equipped with a 2 inch (5.1 centimeter (cm)) stainless steel Cowles stirring blade, and was driven by an air motor.

The components of Side A were all added to the mixing beaker and stirred at ambient temperature until a smooth mixture was obtained. The mixture was then degassed for 30 minutes under reduced pressure (between 88 and 101.6 kilopascal (kPa)). The resulting Part A mixture was then transferred to, and stored in, cylindrical tubes and kept at 40° F. (4° C.) until used.

Part B (Monomer Side)

Samples were prepared on a 200 gram scale using the same equipment as described for Part A. The core/shell rubber material was first dispersed in the (meth)acrylate monomer(s), followed by addition of the succinic anhydride. This was mixed at ambient temperature and an exotherm was observed with temperatures reaching about 130 to 140° F. (54 to 60° C.). Mixing was continued until a smooth dispersion was obtained. The mixture was then cooled to 100° F. (38° C.) by placing the beaker in an ice bath. After removal of the ice bath, the remaining components were added and mixed until a uniform mixture was obtained. The mixture was then degassed for 30 minutes under reduced pressure (between 88 and 101.6 kPa). The resulting Part B mixture was then transferred to, and stored in, cylindrical tubes and kept at 40° F. (4° C.) until used.

Preparation of Polymerizable System

Parts A and B were transferred to a 35 mL (total volume) dual syringe applicator having a 1:10 volume ratio (available as Mixpac System 50, Kit No. MP-050-10-09, from ConProTec, Salem, N.H.), with Part A in the smaller volume side. Care was taken to exclude air pockets from each side as it was filled. The two parts were combined by simultaneous extrusion through a 4 inch (10 cm) long, 17 stage static mixing nozzle (available as Part 4-0-17-5, from ConProTec, Salem, N.H.). The polymerizable system was evaluated for Overlap Shear Strength and Work-life according to the test method outlined herein.

Examples 1–6 and Comparative Examples A–C

The compositions of Examples 1–6 and Comparative Examples A–C were prepared using the amounts shown in Tables 1A and 1B below according to the procedure described in "General Preparation of Polymerizable system Parts A and B". These were used to provide polymerizable systems as described in "Preparation of Polymerizable system" and evaluated using the test method "Work-life" described above. The test results are shown in Table 2 in which overlap shear strengths are reported after various open times. The comparative examples are designated "C.Ex." in the tables below.

TABLE 1A (Examples 1–6; Comparative Examples A–C: Part A)

| Example | TEB-HMDA | CX100 | Paraplex G40 | Cab-O-Sil TS720 | TiO2 |
|---|---|---|---|---|---|
| C. Ex. A | 31.4 | 58.2 | 107.7 | 2.0 | 0.66 |
| C. Ex. B | 31.4 | 58.2 | 107.7 | 2.0 | 0.66 |
| C. Ex. C | 31.4 | 58.2 | 107.7 | 2.0 | 0.66 |
| 1 | 31.4 | 58.2 | 107.7 | 2.0 | 0.66 |
| 2 | 31.4 | 58.2 | 107.7 | 2.0 | 0.66 |
| 3 | 31.4 | 58.2 | 107.7 | 2.0 | 0.66 |
| 4 | 31.4 | 58.2 | 107.7 | 2.0 | 0.66 |
| 5 | 31.4 | 58.2 | 107.7 | 2.0 | 0.66 |
| 6 | 31.4 | 58.2 | 107.7 | 2.0 | 0.66 |

TABLE 1B (Examples 1–6; Comparative Examples A–C: Part B)

| Ex. | THFMA | 2EHMA | SucAnh | NKEster | DBI (wt. %) | Vinyl equivalents in DBI/total vinyl equivalents | B360 | W1600 |
|---|---|---|---|---|---|---|---|---|
| C. Ex. A | 100.9 | 33.6 | 0.46 | 9.84 | 0 (0) | 0 | 45.9 | 9.3 |
| C. Ex. B | 99.3 | 33.1 | 0.46 | 9.84 | 2 (1) | 0.01 | 46.0 | 9.3 |
| C. Ex. C | 97.8 | 32.6 | 0.46 | 9.84 | 4 (2) | 0.021 | 46.0 | 9.3 |
| 1 | 96.3 | 31.6 | 0.46 | 9.84 | 6 (3) | 0.031 | 46.0 | 9.3 |
| 2 | 94.8 | 31.6 | 0.46 | 9.84 | 8 (4) | 0.042 | 46.0 | 9.3 |
| 3 | 93.3 | 31.1 | 0.46 | 9.84 | 10 (5) | 0.052 | 46.0 | 9.3 |
| 4 | 85.8 | 28.6 | 0.46 | 9.84 | 20 (10) | 0.107 | 46.0 | 9.3 |
| 5 | 78.3 | 26.1 | 0.46 | 9.84 | 30 (15) | 0.163 | 46.0 | 9.3 |
| 6 | 70.8 | 23.6 | 0.46 | 9.84 | 40 (20) | 0.222 | 46.0 | 9.3 |

TABLE 2

Overlap Shear Strength in psi (MPa) After Various Open Times

| Ex. | Open Time (minutes) | | | | | | |
|---|---|---|---|---|---|---|---|
| | 0 | 2 | 3 | 4 | 5 | 6 | 7 |
| C. Ex. A | 983 (6.78) SY | 922 (6.36) SY | 852 (5.88) MM | 833 (5.75) MM | 743 (5.12) MM | N.D. | N.D. |
| C. Ex. B | 1020 (6.99) SY | 986 (6.75) CF | 973 (6.66) CF | 906 (6.21) MM | N.D. | N.D. | N.D. |
| C. Ex. C | 1026 (6.03) SY | 1020 (6.99) SY | 1020 (6.99) SY | 942 (6.45) CF/MM | N.D. | N.D. | N.D. |

TABLE 2-continued

Overlap Shear Strength in psi (MPa) After Various Open Times

| | Open Time (minutes) | | | | | | |
|---|---|---|---|---|---|---|---|
| Ex. | 0 | 2 | 3 | 4 | 5 | 6 | 7 |
| 1 | 1044 | 1009 | 974 | 928 | 893 | 855 | 787 |
| | (7.15) | (6.91) | (6.67) | (6.36) | (6.12) | (5.86) | (5.39) |
| | SY | SY | CF | CF | MM | MM | MM |
| 2 | 1044 | 1013 | 980 | 860 | 980 | 926 | 898 |
| | (7.15) | (6.94) | (6.71) | (5.89) | (6.71) | (6.34) | (6.15) |
| | SY | SY | CF | CF | CF | MM | MM |
| 3 | 935 | 934 | 906 | 860 | 828 | 796 | 774 |
| | (6.45) | (6.44) | (6.25) | (5.93) | (5.71) | (5.49) | (5.34) |
| | SY | SY | SY/CF | CF | CF | AF | MM |
| 4 | 830 | 854 | 892 | 905 | 814 | 727 | 729 |
| | (5.72) | (5.89) | (6.15) | (6.24) | (5.61) | (5.01) | (5.03) |
| | CF | CF | CF | CF | CF | CF | CF |
| 5 | 763 | 805 | 820 | 878 | 813 | 747 | 673 |
| | (5.26) | (5.55) | (5.66) | (6.06) | (5.61) | (5.15) | (4.64) |
| | CF | CF | CF | CF | CF | CF | CF |
| 6 | 726 | 741 | 732 | 740 | 706 | 758 | 808 |
| | (5.01) | (5.11) | (5.05) | (4.87) | (4.87) | (5.23) | (5.57) |
| | CF | CF | CF | CF | CF | CF | CF |

N.D. = not determined

Examples 7 and 8, and Comparative Examples D and E

The compositions of Examples 7 and 8, and Comparative Examples D and E were ed using the amounts shown in Tables 3A and 3B below according to the procedure bed in "General Preparation of Polymerizable system Parts A and B". These were used to provide polymerizable systems as described in "Preparation of Polymerizable system" and evaluated using the test methods "Overlap Shear Strength" and "Work-life" bed above. The test results are shown in Table 4 in which overlap shear strengths ported after various open times.

TABLE 3A (Examples 7 and 8, and Comparative Examples D and E: Part A)

| Ex. | TEB-HMDA | AMSPU | CX100 | Cab-O-Sil TS720 | TiO2 |
|---|---|---|---|---|---|
| C. Ex. D | 32.0 | 100 | 59.4 | 7.4 | 1.0 |
| C. Ex. E | 14.6 | 148.6 | 27.1 | 8.4 | 1.3 |
| 7 | 23.7 | 123.5 | 44.0 | 7.7 | 1.2 |
| 8 | 14.8 | 149.3 | 27.5 | 7.3 | 1.1 |

TABLE 3B (Examples 7 and 8, and Comparative Examples D and E: Part B)

| Ex. | THFMA | AMSPU | SucAnh | NKEster | DBI (wt. %) | Vinyl equivalents in DBI/ total vinyl equivalents | B360 | W1600 |
|---|---|---|---|---|---|---|---|---|
| C. Ex. D | 132.4 | 10.0 | 0.98 | 2.38 | 0 (0) | 0 | 52.0 | 2.2 |
| C. Ex. E | 132.6 | 4.0 | 1.49 | 0.11 | 2.2 (1.1) | 0.011 | 55.2 | 4.4 |
| 7 | 120.5 | 4.7 | 0.9 | 2.1 | 17.6 (8.8) | 0.0915 | 50.2 | 4.8 |
| 8 | 113.7 | 1.5 | 1.5 | 0.11 | 32.9 (16.5) | 0.168 | 47.1 | 3.7 |

TABLE 4

Overlap Shear Strength in psi (MPa) After Various Open Times

| | Open Time (minutes) | | | | | | | | |
|---|---|---|---|---|---|---|---|---|---|
| Ex. | 0 | 4 | 6 | 7 | 8 | 10 | 11 | 12 | 19 | 20 |
| C. Ex. D | 964 (6.65) SY, CF | 971 (6.70) SY | 984 (6.79) SY | 981 (6.77) MM | 759 (5.23) MM | 718 (4.95) MM | N.D. | N.D. | N.D. | N.D. |
| C. Ex. E | 1027 (7.08) SY | N.D. | 1003 (6.92) SY | 987 (6.81) MM | ND. | N.D. | N.D. | N.D. | N.D. | N.D. |
| 7 | 1021 (7.04) SY | N.D. | N.D. | N.D. | N.D. | N.D. | 1017 (7.01) SY, CF | 1013 (6.99) MM | N.D. | N.D. |
| 8 | 865 (5.97) CF | N.D. | 974 (6.72) CF | 985 (6.79) CF | N.D. | N.D. | 1016 (7.01) SY | N.D. | 921 (6.35) CF | 995 (6.86) MM |

N.D = Not Determined

Examples 9 and 10, and Comparative Examples F and G

The compositions of Examples 9 and 10, and Comparative Examples F and G were prepared using the amounts shown in Tables 5A and 5B below according to the procedure described in "General Preparation of Polymerizable system Parts A and B". These were used to provide polymerizable systems as described in "Preparation of Polymerizable system" and evaluated using the test methods "Overlap Shear Strength" and "Work-life" described above. The test results are shown in Table 6 in which overlap shear strengths are reported after various open times.

TABLE 5A (Examples 9 and 10, and Comparative Examples F and G: Part A)

| Ex. | TEB-HMDA | CX-100 | Paraplex G40 | Cab-O-Sil TS720 | TiO2 |
|---|---|---|---|---|---|
| C. Ex. F | 31.4 | 58.2 | 107.7 | 2.0 | 0.66 |
| C. Ex. G | 31.4 | 58.2 | 107.7 | 2.0 | 0.66 |
| 9 | 31.4 | 58.2 | 107.7 | 2.0 | 0.66 |
| 10 | 31.4 | 58.2 | 107.7 | 2.0 | 0.66 |

TABLE 5B (Examples 9 and 10, and Comparative Examples F and G: Part B)

| Ex. | THFMA | 2EHMA | SucAnh (wt. %) | NKEster (wt. %) | ItaAnh (wt. %) | MBI (wt. %) | Itaconic based Vinyl equivalents/ total vinyl equivalents | B360 | W1600 |
|---|---|---|---|---|---|---|---|---|---|
| C. Ex. F | 100.9 | 33.6 | 0.46 (0.23) | 9.84 (4.92) | 0.0 (0) | 0 (0) | 0 | 45.9 | 9.3 |
| C. Ex. G | 100.9 | 33.6 | 0 (0) | 9.84 (4.92) | 0.52 (0.26) | 0 (0) | 0.006 | 45.9 | 9.3 |
| 9 | 100.9 | 33.6 | 0.46 (0.23) | 0 (0) | 0.0 (0) | 7.95 (4.01) | 0.053 | 45.9 | 9.3 |
| 10 | 100.9 | 33.6 | 0 (0) | 0 (0) | 0.52 (0.26) | 7.95 (4.01) | 0.058 | 45.9 | 9.3 |

TABLE 6

Overlap Shear Strength in psi (MPa) After Various Open Times

| Example | 0 | 2 | 3 | 4 | 5 | 6 | 7 |
|---|---|---|---|---|---|---|---|
| C. Ex. F | 983 (6.78) SY | 922 (6.36) SY | 852 (5.88) MM | 833 (5.75) MM | 743 (5.12) MM | N.D. | N.D. |
| C. Ex. G | 916 (6.32) SY | 972 (6.70) SY | 787 (5.43) MM | 685 (4.72) MM | N.D. | N.D. | N.D. |

TABLE 6-continued

Overlap Shear Strength in psi (MPa) After Various Open Times

| Example | 0 | 2 | 3 | 4 | 5 | 6 | 7 |
|---|---|---|---|---|---|---|---|
| 9 | 760 (5.24) CF | 837 (5.77) CF | 911 (6.28) CF | 888 (6.12) CF | 828 (5.71) MM | 665 (4.59) MM | 637 (4.39) MM |
| 10 | 579 (3.99) CF | 743 (5.12) CF | 767 (5.29) CF | 742 (5.12) CF | 739 (5.10) CF | 743 (5.12) CF | 704 (4.86) MM |

N.D. = not determined

Comparative Examples H–K

Examples 3 and 4 were repeated, but with the following modifications. Either dibutyl maleate (DBM) or dibutyl fumarate (DBF) was used in place of dibutyl itaconate. The compositions of Comparative Examples H–K were prepared using the amounts shown in Tables 7A and 7B below. The test results are shown in Table 8 in which overlap shear strengths are reported after various open times.

TABLE 7A (Comparative Examples H–K: Part A)

| Example | TEB-HMDA | CX100 | Paraplex G40 | Cab-O-Sil TS720 | TiO2 |
|---|---|---|---|---|---|
| C. Ex. H | 31.4 | 58.2 | 107.7 | 2.0 | 0.66 |
| C. Ex. I | 31.4 | 58.2 | 107.7 | 2.0 | 0.66 |
| C. Ex. J | 31.4 | 58.2 | 107.7 | 2.0 | 0.66 |
| C. Ex. K | 31.4 | 58.2 | 107.7 | 2.0 | 0.66 |

TABLE 7B (Comparative Examples H–K: Part B)

| Ex. | THFMA | 2EHMA | Suc. Anh. | NK Ester | DBM (wt. %) | DBF (wt. %) | Maleate or Fumarate based Vinyl equivalents/ total vinyl equivalents | B-360 | W-1600 |
|---|---|---|---|---|---|---|---|---|---|
| C. Ex. H | 93.3 | 31.1 | 0.46 | 9.84 | 10 (5) | 0 | 0.055 | 46 | 9.3 |
| C. Ex. I | 85.8 | 28.6 | 0.46 | 9.84 | 20 (10) | 0 | 0.112 | 46 | 9.3 |
| C. Ex. J | 93.3 | 31.1 | 0.46 | 9.84 | 0 | 10 (5) | 0.055 | 46 | 9.3 |
| C. Ex. K | 85.8 | 28.6 | 0.46 | 9.84 | 0 | 20 (10) | 0.112 | 46 | 9.3 |

TABLE 8

Overlap Shear Strength in psi (MPa) After Various Open Times

| Example | Open Time (minutes) | | | |
|---|---|---|---|---|
| | 0 | 2 | 4 | 6 |
| C.Ex. H | 991 (6.83) SY | 880 (6.07) CF | 704 (4.86) MM | 512 (3.53) MM |
| C.Ex. I | 736 (5.08) CF | 671 (4.63) CF | 603 (4.16) MM | 496 (3.42) MM |
| C.Ex. J | 897 (6.19) CF | 962 (6.63) CF | 851 (5.87) MM | 568 (3.92) MM |
| C.Ex. K | 838 (5.78) CF | 829 (5.72) CF | 744 (5.13) MM | 464 (3.20) MM |

Examples 11 and 12

Examples 3 and 4 were repeated, but with the following modification. Dimethyl itaconate (DMI) was used in place of dibutyl itaconate. The compositions of Examples 11 and 12 were prepared using the amounts shown in Tables 9A and 9B below. The test 5 results are shown in Table 10 in which overlap shear strengths are reported after various open times.

TABLE 9A (Examples 11 and 12: Part A)

| Example | TEB-HMDA | CX100 | Paraplex G40 | Cab-O-Sil TS720 | TiO2 |
|---|---|---|---|---|---|
| 11 | 31.4 | 58.2 | 107.7 | 2.0 | 0.66 |
| 12 | 31.4 | 58.2 | 107.7 | 2.0 | 0.66 |

TABLE 9B (Exameles 11 and 12: Part B)

| Ex. | THFMA | 2EHMA | Suc. Anh. | NK Ester | DMI (wt. %) | Vinyl equivalents in DMI/ total vinyl equivalents | B-360 | W-1600 |
|---|---|---|---|---|---|---|---|---|
| 11 | 93.3 | 31.1 | 0.46 | 9.84 | 10 (5) | 0.078 | 46 | 9.3 |
| 12 | 85.8 | 28.6 | 0.46 | 9.84 | 20 (10) | 0.155 | 46 | 9.3 |

TABLE 10

Overlap Shear Strength in psi (MPa) After Various Open Times

| Example | Open Time (minutes) | | | | | | |
|---|---|---|---|---|---|---|---|
| | 0 | 2 | 4 | 6 | 7 | 8 | 9 |
| 11 | 859 (5.88) CF | 922 (6.32) CF | 921 (6.31) CF | 951 (6.51) CF | 908 (6.22) CF | N.D. | N.D. |
| 12 | 956 (6.55) CF | 981 (6.72) CF | 976 (6.68) CF | 937 (6.42) CF | 952 (6.52) CF | N.D. | N.D. |

Example 13

The composition of Example 13 was prepared using the amounts shown in Tables 11A and 11B below according to the procedure described in "General Preparation of Polymerizable system Parts A and B". These compositions were used to provide polymerizable systems as described in "Preparation of Polymerizable system" and evaluated using the test method "Work-life" described above. The test results are shown in Table 12 in which overlap shear strengths are reported after various open times.

TABLE 11A (Example 13: Part A)

| Example | TEB-HMDA | D2000 | AMSPU | Cab-O-Sil TS720 | TiO2 |
|---|---|---|---|---|---|
| 13 | 23.7 | 44.0 | 123.4 | 7.7 | 1.2 |

TABLE 11B (Example 13: Part B)

| Ex. | THFMA | CN-965 | Suc. Anh. | DBI (wt. %) | Vinyl equivalents in DBI/ total vinyl equivalents | B-360 | G-3500 | NPAL |
|---|---|---|---|---|---|---|---|---|
| 13 | 122.1 | 5.0 | 1.4 | 17.6 (8.8) | 0.498 | 50.2 | 3.36 | 0.4 |

TABLE 12

Overlap Shear Strength in psi (MPa) After Various Open Times

| | Open Time (minutes) | | | | |
|---|---|---|---|---|---|
| Example | 0 | 6 | 8 | 10 | 12 |
| 13 | 1012 (6.93) SY/CF | 1009 (6.91) SY | 1006 (6.89) SY | 1005 (6.88) CF | 934 (6.39) MM |

Examples 14–17 and Comparative Example L

The compositions of Examples 14–17 and Comparative Example L were prepared using the amounts shown in Tables 13A and 13B below according to the procedure described in "General Preparation of Polymerizable system Parts A and B". Five different anhydride components were employed. Type 1 was allylsuccinic anhydride; Type 2 was 2-octen-1-ylsuccinic anhydride; Type 3 was isobutenylsuccinic anhydride; Type 4 was itaconic anhydride; and Type 5 was succinic anhydride. These compositions were used to provide polymerizable systems as described in "Preparation of Polymerizable system" and evaluated using the test method "Work-life" described above. The test results are shown in Table 14 in which overlap shear strengths are reported after various open times.

TABLE 13A (Examples 14–17; Comparative Example L: Part A)

| Example | TEB-HMDA | CX100 | Paraplex G40 | Cab-O-Sil TS720 | TiO2 |
|---|---|---|---|---|---|
| 14 | 31.4 | 58.2 | 107.7 | 2.0 | 0.66 |
| 15 | 31.4 | 58.2 | 107.7 | 2.0 | 0.66 |
| 16 | 31.4 | 58.2 | 107.7 | 2.0 | 0.66 |
| 17 | 31.4 | 58.2 | 107.7 | 2.0 | 0.66 |
| C. Ex. L | 31.4 | 58.2 | 107.7 | 2.0 | 0.66 |

TABLE 13B (Examples 14–17; Comparative Example L: Part B)

| Ex. | THFMA | 2EHMA | NK Ester | Anhydride Type | Anhydride | Anhydride based Vinyl equivalents/ total vinyl equivalents | B-360 | G-3500 |
|---|---|---|---|---|---|---|---|---|
| 14 | 100.9 | 33.6 | 1.4 | 1 | 3.2 | 0.03 | 45.9 | 9.3 |
| 15 | 100.9 | 33.6 | 1.4 | 2 | 4.8 | 0.03 | 45.9 | 9.3 |
| 16 | 100.9 | 33.6 | 1.4 | 3 | 3.6 | 0.03 | 45.9 | 9.3 |
| 17 | 100.9 | 33.6 | 1.4 | 4 | 3.0 | 0.03 | 45.9 | 9.3 |
| C. Ex. L | 100.9 | 33.6 | 1.4 | 5 | 2.3 | 0.03 | 45.9 | 9.3 |

TABLE 14

Overlap Shear Strength in psi (MPa) After Various Open Times

| | Open Time (minutes) | | | | | | | |
|---|---|---|---|---|---|---|---|---|
| Ex. | 0 | 1 | 2 | 3 | 4 | 5 | 6 | 7 |
| 14 | 1026 (7.03) SY | 986 (6.75) CF/SY | 1010 (6.92) CF/SY | 1008 (6.9) SY | 919 (6.29) CF | 770 (5.27) MM | 761 (5.21) MM | 677 (4.64) MM |
| 15 | 1004 (6.88) SY | 971 (6.65) CF/SY | 1006 (6.89) CF/SY | 909 (6.23) CF | 853 (5.84) CF | 879 (6.02) CF | 881 (6.03) MM | 710 (4.86) MM |

TABLE 14-continued

Overlap Shear Strength in psi (MPa) After Various Open Times

| | Open Time (minutes) | | | | | | | |
|---|---|---|---|---|---|---|---|---|
| Ex. | 0 | 1 | 2 | 3 | 4 | 5 | 6 | 7 |
| 16 | 1005 | 992 | 999 | 1006 | 902 | 995 | 907 | 960 |
| | (6.88) | (6.79) | (6.84) | (6.89) | (6.18) | (6.82) | (6.21) | (6.57) |
| | CF | CF/SY | SY | SY | CF | CF/SY | CF/SY | CF/SY |
| 17 | 730 | 774 | 692 | 855 | 870 | 893 | 897 | 933 |
| | (5.0) | (5.30) | (4.74) | (5.86) | (5.96) | (6.12) | (6.14) | (6.39) |
| | CF | CF | CF | CF | CF | CF | CF | CF |
| C. Ex. L | 1015 | 1001 | 1008 | 1008 | 724 | 747 | 876 | N.D. |
| | (6.95) | (6.86) | (6.90) | (6.90) | (4.96) | (5.12) | (6.0) | |
| | SY | CF/SY | CF/SY | CF/SY | CF | MM | MM | |

N.D. = not determined

Table 14 demonstrates that examples of the invention retain at least 85% or greater overlap shear strength after an extended open time and maintain either a cohesive failure mode and/or produce a substrate yielding bond.

What is claimed is:

1. A polymerizable system comprising:
   (a) an organoborane;
   (b) at least one polymerizable monomer; and
   (c) a work-life extending agent according to the general formula:

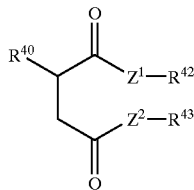

wherein $R^{40}$ is $CH_2=$ or alkenyl, $Z^1$ and $Z^2$ are independently O, N—R", or S, and $R^{41}$, $R^{42}$ and $R^{43}$ are independently H, alkyl, aryl or cycloalkyl,
provided that when $Z^1$ and $Z^2$ are O, $R^{42}$ and $R^{43}$ are independently alkyl, aryl or cycloalkyl.

2. The polymerizable system of claim 1 wherein $R^{42}$ and $R^{43}$ are butyl, and $Z^1$ and $Z^2$ are O.

3. The polymerizable system of claim 1 wherein $R^{40}$ is vinyl.

4. A polymerizable system comprising:
   (a) an organoborane;
   (b) at least one polymerizable monomer; and
   (c) at least 2.5 weight percent of itaconic acid, itaconic acid derivatives or combinations thereof.

5. The polymerizable system of claim 4, wherein the itaconic acid derivative comprises itaconic mono(butyl) ester.

6. The polymerizable system of claim 4, wherein the itaconic acid derivative comprises itaconic di(butyl) ester.

7. The polymerizable system of claim 1 further comprising a decomplexer.

8. The polymerizable system of claim 7, wherein the organoborane is complexed with a complexing agent comprising a material selected from amines, amidines, hydroxides, alkoxides, and combinations thereof.

9. The polymerizable system of claim 1, wherein the at least one polymerizable monomer comprises a material selected from (meth)acrylates, (meth)acrylamides, and mixtures thereof.

10. The polymerizable system of claim 9, wherein the at least one polymerizable monomer comprises a material selected from (meth)acrylic esters of monohydric alcohols and (meth)acrylic said esters of polyhydric alcohols.

11. The polymerizable system of claim 1 further comprising a vinyl aromatic compound according to general formula:

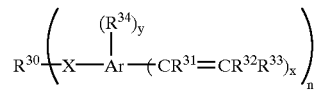

wherein:
n is an integer having a value of 1 or greater;
x is an integer having a value of 1 or greater;
y is n integer having a value of 0 or greater;
Ar is a substituted aryl group;
$R^{31}$, $R^{32}$ and $R^{33}$ are independently selected from the group consisting of hydrogen, alkyl, aryl and halogen;
$R^{34}$ is an organic group wherein each $R^{34}$ is independently selected from the group consisting of alkyl, alkoxy, alkanoyl, alkanoyloxy, aryloxy, aroyl, aroyloxy, and halogen;
X is a divalent organic group or a covalent bond; and $R^{30}$ is an organic group; wherein a total molecular weight of each X plus $R^{30}$ is 100 or greater.

12. The polymerizable system of claim 1, wherein the polymerizable system retains at least 85% or greater overlap shear strength after an extended open time.

13. The polymerizable system of claim 12 wherein the extended open time is between about 7 minutes and 20 minutes.

14. The polymerizable system of claim 1 further comprising a core-shell polymer.

15. The polymerizable system of claim 1 further comprising a reactive diluent.

* * * * *

UNITED STATES PATENT AND TRADEMARK OFFICE
CERTIFICATE OF CORRECTION

PATENT NO. : 6,762,261 B2
DATED : July 13, 2004
INVENTOR(S) : Deviny, E. John

It is certified that error appears in the above-identified patent and that said Letters Patent is hereby corrected as shown below:

Column 3,
Line 28, after "$R^{44}$" insert -- is --.

Column 7,
Line 3, after "pyridine" insert -- . --.

Column 15,
Line 22, delete "4".
Line 36, delete "isobomyl" and insert in place thereof -- isobornyl --.

Column 16,
Line 29, delete "carbon–,–carbon" and insert in place thereof -- carbon– –carbon --.
Lines 29-30, delete "carbon–,–carbon" and insert in place thereof -- carbon– –carbon --.

Column 18,
Line 54, after "3.0:1.0" insert -- . --.

Column 26,
Line 7, delete "ed" and insert in place thereof -- prepared --.
Lines 8 and 13, delete "bed" and insert in place thereof -- described --.
Line 15, delete "ported" and insert in place thereof -- reported --.

Column 30,
Line 28, after "test" delete "5".
Table 9B, line 1, delete "Exameles" and insert in place thereof -- Examples --.

Column 33,
Line 25, delete "organborane" and insert in place thereof -- organoborane --.
Line 39, delete "N–R"" and insert in place thereof -- $N–R^{41}$ --.

UNITED STATES PATENT AND TRADEMARK OFFICE
CERTIFICATE OF CORRECTION

PATENT NO. : 6,762,261 B2
DATED : July 13, 2004
INVENTOR(S) : Deviny, E. John

It is certified that error appears in the above-identified patent and that said Letters Patent is hereby corrected as shown below:

<u>Column 34,</u>
Line 26, delete "said" and insert in place thereof -- acid --.

Signed and Sealed this

Seventh Day of December, 2004

JON W. DUDAS
*Director of the United States Patent and Trademark Office*